Feb. 20, 1945.   L. SPENCER   2,369,865
PRESSURE LIMITING WASHER ASSEMBLY
Filed Feb. 13, 1943   2 Sheets-Sheet 1

Inventor
Lee Spencer
By Clarence A. O'Brien
and Harvey B. Jacobson
Attorneys

Feb. 20, 1945.  L. SPENCER  2,369,865
PRESSURE LIMITING WASHER ASSEMBLY
Filed Feb. 13, 1943  2 Sheets—Sheet 2
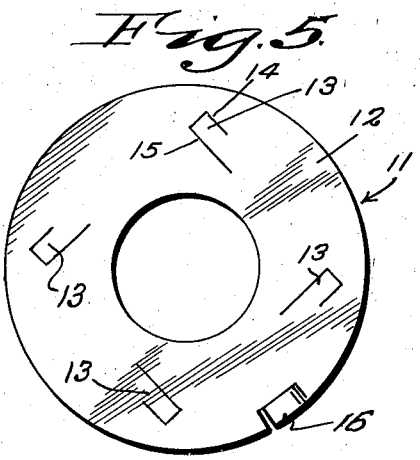
Fig. 5.
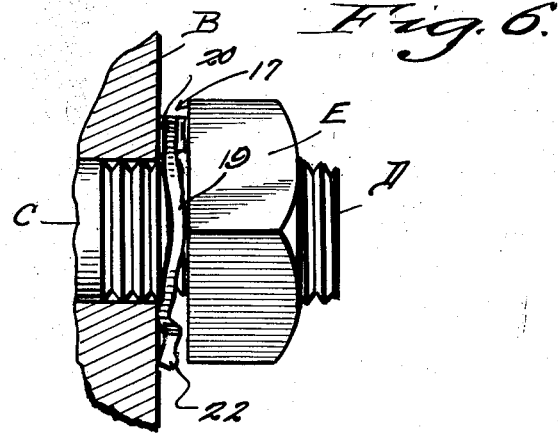
Fig. 6.
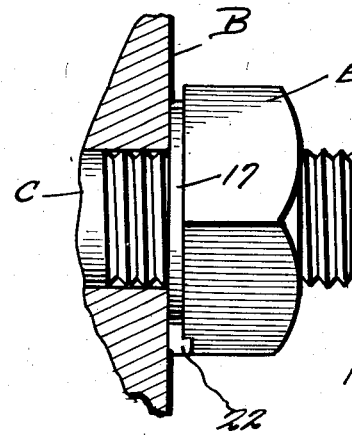
Fig. 7.
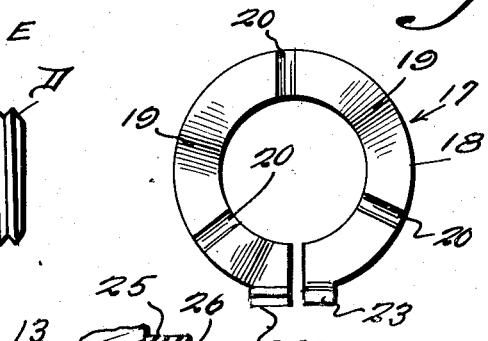
Fig. 8.
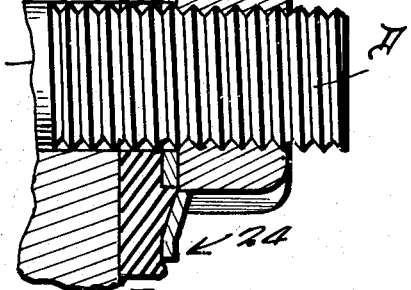
Fig. 10.
Fig. 9.
Inventor
Lee Spencer
By Clarence A. O'Brien
and Harvey B. Jacobson
Attorneys Patented Feb. 20, 1945

2,369,865

UNITED STATES PATENT OFFICE 2,369,865

PRESSURE LIMITING WASHER ASSEMBLY

Lee Spencer, Jamaica, N. Y.

Application February 13, 1943, Serial No. 475,830

4 Claims. (Cl. 151—38)

This invention relates to a novel method and means for bolting and securely clamping companion or complemental members together, and has particular reference to a pressure limiting washer assembly which is expressly, but not necessarily, applicable to rail fasteners, for instance, the type employing conventional fish plates assembled and held in place by regular or customary bolts and nuts.

My invention constitutes means embracing the shank of the bolt and interposed between the nut and adjacent work part and expressly designed to be actuated by the nut pressure to limit the inward clamping feed motion of said nut and to in this manner precautiously and mechanically prevent both over-tightening and under-tightening of said nut.

Under present day conditions, and as nuts are generally used, the tension applied to the bolt is governed by the degree of torque applied to the nut. This torque may be moderate or extreme, according to the fit of the nut on the threads of the bolts, tight threads producing a hard turning nut, loose threads an easy turning nut. An equal pressure applied in tightening these two varieties results in limited tension in the bolt with the hard turning nut, and the reverse with the easy running nut, that is, high bolt tension.

These observations in the fields are actual, there now being no practical means of insuring uniform bolt tension. It is essential, however, that these bolts have uniform tension. Tests made show that with bolts tightened by machine with an adjustment on the machine to insure uniform torque on the nut, bolt tension varied from 4,000 pounds to 24,000 pounds instead of the desired 12,000 pounds.

When these bolts are tightened in by hand wrenches, about the same variation of results are obtained as a workman tightens with the wrench until he feels a certain strain and considers it a good job, but as he has exerted his strength on the threads only, it is found that with poor hard working threads hardly any bolt tension exists and on the free running bolts, too much presents itself.

Briefly, the invention hereinafter comprehended is to disregard the torsion entirely, this by employing pressure limiting spring washer means to obtain the tension desired.

Other features and advantages of the invention will become more readily apparent from the following description and the accompanying illustrative drawings.

In the drawings, wherein like numerals are employed to designate like elements and parts throughout the same:

Figure 5 is a detail view of the concavo-convex washer per se.

Figure 6 is a view partly in section and partly in elevation showing a fish plate, threaded bolt-shank, nut and a different form or modified style of washer before it is compressed to nut-checking position.

Figure 7 is a view like Figure 6 showing the nut threaded "home" with the washer in its final position.

Figure 8 is an elevational view of the style of the washer seen in Figure 6, showing only the washer.

Figure 9 is a fragmentary elevational and sectional view of a further modification employing companion washers and showing these in their non-active or inert positions.

Figure 10 is a view like Figure 9, showing the nut tightened up and the coacting washers assuming their "stop-nut" positions.

Figure 1:
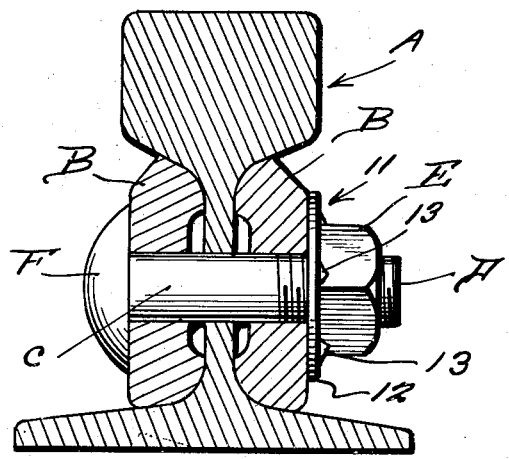
Figure 1 is a transverse or cross-sectional view through track rail sections, adjoining fish plates on opposite sides thereof, there being shown, in elevation, a conventional bolt and nut, and the especially designed washer representing the preferred embodiment of the invention.
Figure 2:
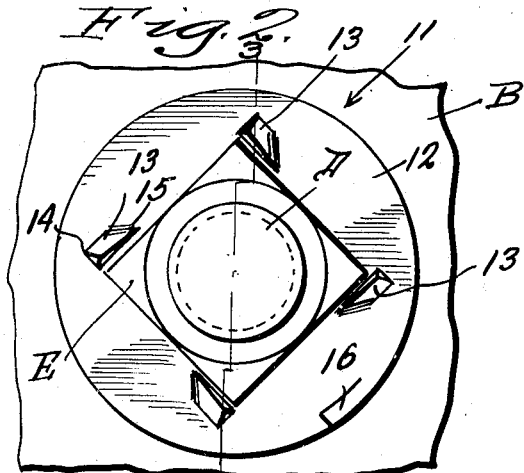
Figure 2 is a detail enlarged elevational view looking at the nut-equipped end of the bolt and bringing out the construction of the novel nut checking washer seen in Figure 1.
Figure 3:
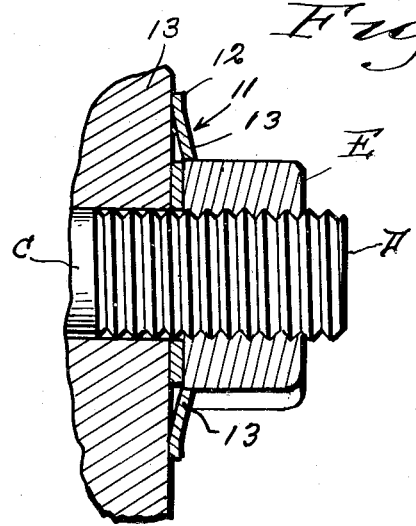
Figure 3 is a section on the line 3—3 of Figure 2.

By way of introduction to the detailed description, I desire it understood that the structural means available for achieving the results under advisement is and will be variable in basic characteristics.

One form or species of the invention is covered in Figures 1 to 5, inclusive, a second in Figures 6 to 8, inclusive, and a third in Figures 9 and 10. These will be separately described for a clear comprehension of the invention.

Reference being had to Figures 1 to 5, inclusive, the track, generally made up of rail sections, is denoted by the reference character A, the fish plates are differentiated by the letters B, these being held together and serving to join the rail sections through the medium of a bolt and nut assembly. The shank C pierces the fish plates and web of the rail and has its threaded end D carrying the clamping nut E, the head F bearing against one of the fish plates. It is the means 11 with which we are principally concerned.

Figure 4:
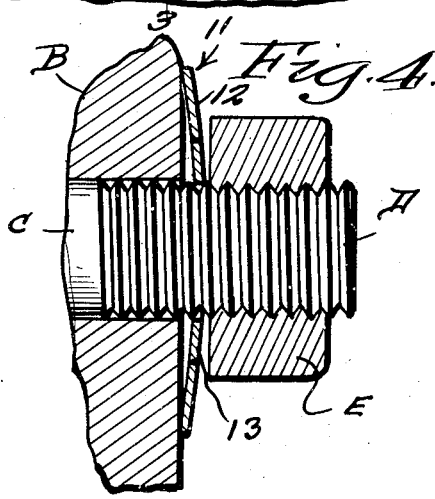
Figure 4 is a view like Figure 3 showing a concavo-convex washer in the position before it is forced into the active position seen in Figure 3.

Specifically, the above means 11 (Figs. 1 to 5, inclusive) comprises a spring steel washer 12 of appropriate diameter in relation to the marginal dimensions of the nut E. This washer, as seen in Figure 4, is concavo-convex in its natural or unbent form. It is provided at equi-distant, circumferentially spaced points with struck-out tongues functioning as detents 13. It is to be noted that there is a short slit 14 on the outer peripheral side and a longer slit 15 on the opposite or inner peripheral side, the slit 15 thus being in a region toward the central shank-accommodating hole or aperture of the washer. This is calculated to cause the detents to spring outwardly with their inner edges 15 adjacent to the marginal edges of the nut, as brought out to advantage in Figure 2. Under this predetermined arrangement the edges of the tongues thus presented to the nut are such as to definitely seize said nut and to prevent further turning in a direction toward the washer, that is, when the washer is flattened and pressed upon to the desired degree predetermined by the manufacturer. This canting or tilting feature of the detent tongues is important, as is obvious from a careful consideration of Figure 2. There is another and auxiliary tongue 16 struck out from the washer, but this is on the outer perimeter or marginal edge. Moreover, it is laterally bent inwardly, that is, in a direction toward the fish plate or other element with which it cooperates. The purpose of this element 16 is its ability to serve as a tongue to figuratively "dig" into the surface of the work and lock the washer so that the washer is prevented from turning in relation to the nut and the work, and so that the detents will spring quickly into their respective holding positions. It will thus be seen that we have here a simple washer, circumferentially spaced, struck-out tongues functioning as detents, the tongues being of special design and there being a dog or equivalent anti-slipping tongue 16 to serve as just described.

Reference is now directed to Figures 6, 7 and 8. Here the check means 17 is, again, in the form of a washer 18. But this is a split washer. It will be noted that at predetermined points the washer is arched into arcuate bends 19 and at circumferentially spaced points between the bends there are indentations 20 pressing against the fish plates in the manner brought out in Figure 6. These features 19 and 20, collectively speaking, serve to render the washer more sensitive and thus quickly responsive to perform the desired function. It is to be noted that on opposite sides of the slit are two lugs 22 and 23, respectively. The lug 22 in relation to side elevational picturization of the washer, is directed outwardly so as to be in a position to quickly seize the edge portion of the nut when the desired pressure of the nut against the washer is reached. On the other hand, the complemental tongue 23 is bent inwardly in an opposite direction to the tongue or lug 22, and its function is to serve as the part 16 in Figure 5, that is, as an anti-slipping dog, as it were. This dog obviously serves to lock the washer to the work, whereby to permit the features 19, 20 and 22 to respond and come into play for the purposes already described.

And now we come to the third modification, embodying the aforementioned structural and functional principles, shown in Figures 9 and 10. Here the nut check and locking means is denoted by the numeral 24. As brought out advantageously in Figure 9, there are two washers here employed, the compressible rubber washer 25 being a sort of a self conforming filler, and the spring metal washer 26 is like the washer 12, except that it is flat instead of concavo-convex. That is to say, the washer 26 has pressure responsive tongues forming snap-action detents 27. Here the detents are pressed into nut-retaining position by the rubber washer. Referring to Figure 9, and then to Figure 10, it will be seen that as the nut is turned home, the rubber washer is squeezed or compressed and portions thereof attempting to find an outlet, project themselves into the openings defining the detents or tongues 27. Thus, the tongues are pressed and jut out quickly and grippingly engage the nut to stop the rotation in a manner already described. Manifestly, all parts will have to be carefully and scientifically manufactured in order to insure the desired cooperative and coinciding functions.

Thus, it will be seen that although there are other ways and means of accomplishing the same basic result, the three embodiments illustrated are, apparently, sufficiently comprehensive to enable the reader to understand the invention and the extensive nature thereof in so far as scope is concerned.

As long as bolts and threaded nuts have been used to join and fasten two or more elements or members together, it has been recognized that provision must be made for some sort of spring washer or equivalent part between the bolt and the nut to take up the slack caused by wear, and maintain tension between the held parts to prevent the nut from backing off the threads on the bolt.

I have noted that there was a real need for more than this and presume the same need exists in other fields. On the railroad, rail joints are generally bolted together with fish plates and bolts incorporating the aforesaid washers to keep the slack out of the parts which are bolted together in the conventional manner. But it can be seen, from practical results, that these spring washers do not perform as intended; some bolts being over-tightened and tending to "freeze" these parts together, that were designed to be held only so tightly together that there would be free movement of these parts longitudinally due to allowance for proper expansion; others were held together so loosely that wear developed very quickly.

Tests, as well as observation, showed that all these devices were constructed on the principle that a certain pressure applied in turning up the nut governed the amount of tension in the bolt. In short, the torsion applied to the nut was the determining factor as to how tight these parts were held in relation to each other. If a hard turning nut was used, little tension was created, and if a free nut was used, a small amount of torsion created equal tension. I made several trials of different ways to get a uniform result, all of these being based on the same principle, that a spring filler of some kind be used between the nut and the face of the held part, this spring filler being so shaped and manufactured that after a predetermined pressure or tension was developed, it would be impossible to further tighten the nut beyond this predetermined point regardless of the torsion applied to the nut or just exactly opposite all these other attempts.

All previous attempts seemed to take it for granted that there would be uniform tension applied to a bolt if uniform torsion was applied to the nut. There were numerous devices that depended on visual observation to show when a certain tension was reached, such as washers which flattened out to a flat plane when under certain compression, but nothing that prevented further tightening beyond that point.

I have attempted to, and think succeeded in, getting away from the human element with my devices inasmuch as at some point that is built into these devices the nut is stopped with a positive stop preventing tightening beyond the desirable point and in this way overcoming the shortcomings of all these other nut locks or washers which cannot and do not attempt this and can find no reference to this problem anywhere or attempts to get results such as I claim.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

I claim:

1. Washer means for use under a nut to limit bolt tension due to tightening, comprising a spring metal washer of disc shape with means to avoid slipping between the washer and work, the washer having detents normally out of gripping contact with the nut, but which are deflected toward the nut to engage the perimeter thereof by predetermined reactive pressure due to tightening the nut on the bolt, to prevent further tightening.

2. A washer assembly for use under a nut to limit bolt tension due to tightening, consisting of two companion washers, one of non-metallic resilient material and the other of substantially flat spring metal having spaced tongues normally in the plane of the washer, but which are deflected toward the nut to engage the surface thereof, by predetermined reactive pressure of the resilient washer due to tightening the nut on the bolt, to prevent further tightening.

3. A washer, for use under a nut to limit bolt tension due to tightening, of spring metal and concavo-convex shape having tongues arranged at spaced points normally lying in the surface of the washer and a work engaging tongue extending outwardly from the concavo side, the first tongue to be deflected toward the nut to engage the surface thereof, when the washer is flattened to a point corresponding to a predetermined pressure, to prevent further tightening.

4. A washer, for use under a nut to limit bolt tension due to tightening, of spring metal, radially split and undulating surface having contact points to engage the work and provided on opposite sides of the split with outstanding lugs projecting laterally of the general plane of the washer in opposite directions and normally out of gripping contact with the nut, but which are deflected toward the nut to engage the surface thereof when the washer is flattened to a point corresponding to a predetermined pressure, to prevent further tightening.

LEE SPENCER.